(12) United States Patent
Ahn et al.

(10) Patent No.: US 6,681,111 B2
(45) Date of Patent: Jan. 20, 2004

(54) ROAMING SERVICE SYSTEM FOR GSM SERVICE SUBSCRIBER IN CDMA SERVICE AREA, AND METHOD FOR REGISTERING LOCATIONS AND TRANSMITTING AND RECEIVING SIGNALS AND SHORT MESSAGES USING THE SYSTEM

(75) Inventors: Byung-Ik Ahn, Seoul (KR); Chan-Ho Yun, Koyang (KR); Yuon-Pil Jeung, Seoul (KR); Kwang-Wuk Lee, Koyang (KR); Cheol-Hyun Kang, Seoul (KR); Seong-Jin Choi, Seoul (KR)

(73) Assignee: Korea Telecom Freetel Co., Ltd., Seoul (KR)

( * ) Notice: Subject to any disclaimer, the term of this patent is extended or adjusted under 35 U.S.C. 154(b) by 449 days.

(21) Appl. No.: 09/834,952

(22) Filed: Apr. 16, 2001

(65) Prior Publication Data

US 2002/0061745 A1 May 23, 2002

(30) Foreign Application Priority Data

Nov. 16, 2000 (KR) ........................................ 2000-67944

(51) Int. Cl.$^7$ ................................................. H04Q 7/20
(52) U.S. Cl. ..................... 455/432.2; 455/560; 455/466; 455/432.1
(58) Field of Search ........................... 455/432.1, 432.2, 455/466, 552.1, 560

(56) References Cited

U.S. PATENT DOCUMENTS

| | | | | |
|---|---|---|---|---|
| 5,852,776 A | * | 12/1998 | Ohlsson | ...................... 455/406 |
| 5,862,481 A | * | 1/1999 | Kulkarni et al. | .......... 455/432.2 |
| 5,933,784 A | * | 8/1999 | Gallagher et al. | ........ 455/552.1 |
| 5,946,634 A | * | 8/1999 | Korpela | ................... 455/552.1 |
| 6,091,953 A | * | 7/2000 | Ho et al. | ..................... 455/433 |
| 6,151,507 A | * | 11/2000 | Laiho et al. | ................. 455/466 |
| 6,154,647 A | * | 11/2000 | Dahlin et al. | ............. 455/426.1 |
| 6,178,337 B1 | * | 1/2001 | Spartz et al. | ................ 455/561 |
| 6,397,065 B1 | * | 5/2002 | Huusko et al. | .......... 455/435.2 |
| 6,515,997 B1 | * | 2/2003 | Feltner et al. | .............. 370/401 |
| 6,526,033 B1 | * | 2/2003 | Wang et al. | ................ 370/338 |
| 6,564,055 B1 | * | 5/2003 | Hronek | ....................... 455/433 |

* cited by examiner

Primary Examiner—William Trost
Assistant Examiner—Nawara T. Omary
(74) Attorney, Agent, or Firm—Larson & Taylor, PLC

(57) ABSTRACT

Disclosed is a roaming service system in a CDMA service area for GSM service subscribers, which comprises a CDMA system comprising a CDMA HLR storing information on subscribers' locations and services, a CDMA MSC connected to the CDMA HLR and accessing calls, and a CDMA terminal wirelessly connected to the CDMA MSC and capable of having a SIM card removably installed therein; a GSM system comprising a GSM HLR storing information on the subscribers' locations and services, a GSM MSC connected to the GSM HLR and accessing calls, an authentication center (AuC) connected to a GSM network and authenticating terminals, and a GSM terminal wirelessly connected to the GSM MSC; and an IRGS connected between the CDMA system and the GSM system and converting signals to execute signal communications between the systems, and when a subscriber of a service provided by the GSM system moves to an area in which the subscriber can use the service provided by the CDMA system and installs the subscriber's SIM card in the CDMA terminal, transmissions of predetermined data necessary for a GSM authentication by the CDMA system being executed using a CDMA message so that tasks of initial location registration of the GSM service subscriber, a location registration when the location is modified, sending and receiving calls with other subscribers, and a short message service (SMS) are enabled.

25 Claims, 12 Drawing Sheets

US 6,681,111 B2

ROAMING SERVICE SYSTEM FOR GSM SERVICE SUBSCRIBER IN CDMA SERVICE AREA, AND METHOD FOR REGISTERING LOCATIONS AND TRANSMITTING AND RECEIVING SIGNALS AND SHORT MESSAGES USING THE SYSTEM

BACKGROUND OF THE INVENTION (a) Field of the Invention

The present invention relates to a roaming service system for the global system for mobile communications (GSM) service subscribers in code division multiple access (CDMA) service areas, and methods for registering locations, and transmitting and receiving signals and short messages using the roaming service system. More specifically, the present invention relates to a roaming service system for a GSM service subscriber who installs a subscriber identity module (SIM) card in a CDMA terminal and receives the roaming service in the CDMA service areas, and methods for registering locations and transmitting and receiving signals and short messages using the roaming service system.

(b) Description of the Related Art

Recently, as the demand for mobile communications has greatly increased, requests for global roaming services that enable users to telephone using a single telephone number all over the world have increased.

Presently, when a GSM service subscriber who lives in another country comes to Korea and wishes to receive the CDMA service, the user rents a new terminal at a service agency or an airport lounge and obtains a new subscriber phone number.

Particularly in the GSM method, the subscriber installs a SIM card which stores the subscriber's profile in the subscriber's terminal. In this kind of mobile communication using the SIM card, the user can borrow a SIM-support terminal in any country that provides the GSM service, install the user's SIM card in the terminal and use the user's own telephone number. However, in Korea, which provides the CDMA service, the GSM subscribers cannot use their own phone numbers using the SIM card.

Recently, countries that have adopted the CDMA method have gradually started using the advantages of the SIM card by adopting a user identity module (UIM) card which is similar to the SIM card. Accordingly, CDMA terminals that use the UIM card are being developed. Even though the size of the SIM card is identical with that of the UIM card and the SIM card can be installed in the CDMA terminal, since the CDMA service method is different from the GSM service method, the user cannot receive mobile communication service using the CDMA terminal with a SIM card installed.

SUMMARY OF THE INVENTION

It is an object of the present invention to provide a roaming service on the CDMA network by installing the GSM-type SIM card into the CDMA terminal.

In one aspect of the present invention, a roaming service system in a CDMA service area for a GSM service subscriber comprises: a CDMA system comprising a CDMA home location register (HLR) storing information on subscribers' locations and services, a CDMA mobile switching center (MSC) connected to the CDMA HLR and accessing calls, and a CDMA terminal wirelessly connected to the CDMA MSC and capable of having a subscriber identity module (SIM) card removably installed therein; a GSM system comprising a GSM HLR storing information on the subscribers' locations and services, a GSM MSC connected to the GSM HLR and accessing calls, an authentication center (AuC) connected to a GSM network and authenticating terminals, and a GSM terminal wirelessly connected to the GSM MSC; and an international roaming gateway system (IRGS) connected between the CDMA system and the GSM system and converting signals to execute signal communications between the systems, and when a subscriber of a service provided by the GSM system moves to an area in which the subscriber can use the service provided by the CDMA system and installs the subscriber's SIM card in the CDMA terminal, transmissions of predetermined data necessary for a GSM authentication by the CDMA system being executed using a CDMA message so that tasks of initial location registration of the GSM service subscriber, a location registration when the location is modified, sending and receiving calls with other subscribers, and a short message service (SMS) are enabled.

In another aspect of the present invention, in a method for registering a location when a subscriber of the GSM system service moves to a CDMA system service area and installs a SIM card in a CDMA terminal and roams to the CDMA system service in a system comprising a CDMA system comprising a CDMA MSC accessing calls, and a CDMA terminal wirelessly connected to the CDMA MSC and capable of having the SIM card removably installed therein; a GSM system comprising a GSM HLR storing information on the subscribers' locations and services, and an AuC connected to a GSM network and authenticating terminals; and an IRGS connected between the CDMA system and the GSM system and converting signals to execute signal communications between the CDMA and GSM systems, a method for registering a location when a GSM service subscriber roams to the CDMA service comprises: (a) the CDMA terminal requesting a location registration from the CDMA MSC; (b) the CDMA MSC, when receiving the location registration request, authenticating the GSM subscriber via the IRGS that transmits data to the CDMA terminal using a CDMA message in cooperation with the GSM system and the data needed for the GSM authentication; and (c) registering the GSM subscriber via message transmissions between the IRGS and GSM HLR when the authentication of the GSM service subscriber is completed.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiments of the invention have been shown and described, simply by way of illustration of the best modes contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
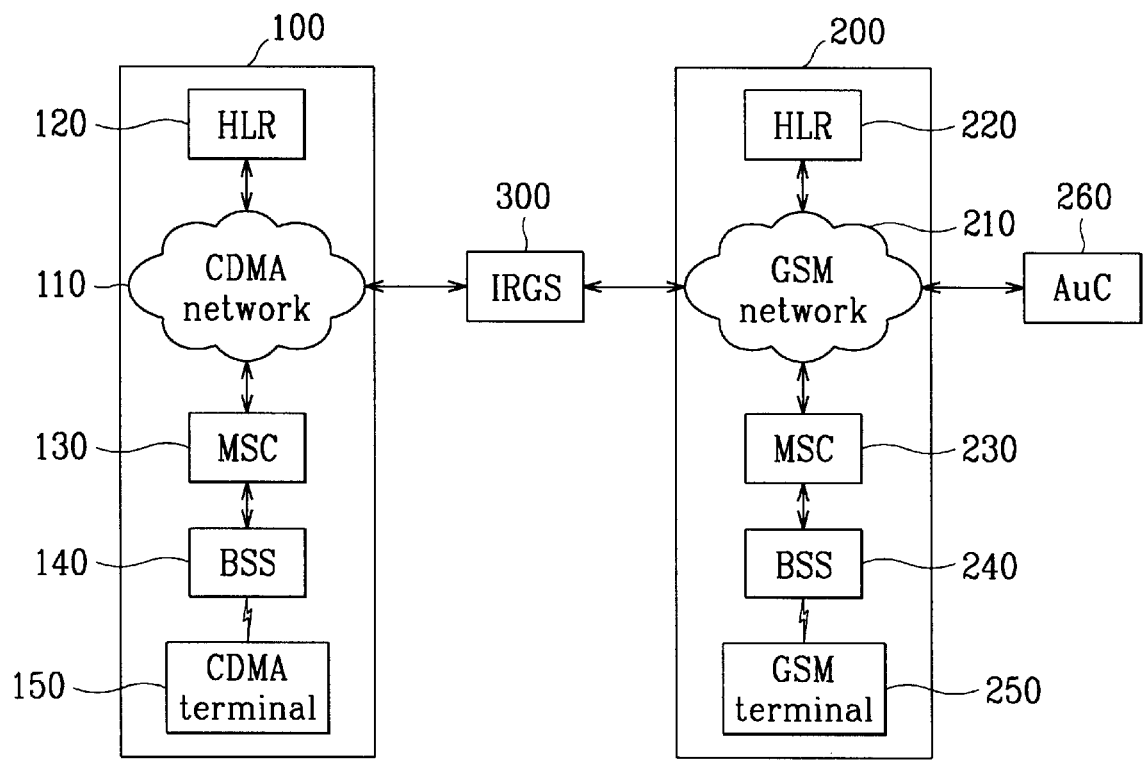
FIG. 1 shows a roaming service network using a SIM card in a CDMA service area according to a first preferred embodiment of the present invention.

FIG. 1 shows a roaming service network using a SIM card in a CDMA service area according to a first preferred embodiment of the present invention.

As shown, the roaming service system comprises a CDMA system 100, a GSM system 200 and an international roaming gateway system (IRGS) 300 for connecting the CDMA system 100 with the GSM system 200.

The CDMA system 100 comprises a home location register (HLR) 120 connected to a CDMA network 110 and storing information on the subscribers' locations and services, a mobile switching center (MSC) 130 connected to the CDMA network 110 and processing call accesses, a base station system (BSS) 140 connected to the MSC 130 and performing an interface between a wire network and a wireless area, and a CDMA terminal 150 wirelessly connected to the BSS 140 and capable of having a SIM card installed therein.

The CDMA system 100 has a plurality of HLRs and MSCs, and the HLRs and the MSCs operate together to manage the subscribers and exchange the calls. A plurality of MSCs is connected to a single HLR, and a plurality of BSSs can be connected to a single MSC. The CDMA system 100 can further comprise an authentication center (AuC) authenticating a terminal, and a visit location register (VLR) installed in the MSC 130 and storing information on visitors and registrations.

The configuration of the GSM system 200 is similar to that of the CDMA system 100. The GSM system 200 comprises an HLR 220 connected to a GSM network 210 and storing information on the subscribers, locations and services, an MSC 230 connected to the GSM network 210 and processing the call accesses, an AuC 260 connected to the GSM network 210 and authenticating the terminals, a BSS 240 connected to the MSC 230 and performing an interface between the wire network and the wireless area, and a GSM terminal 250 wirelessly connected to the BSS 240.

The GSM system 200 has a plurality of HLRs, MSCs and BSSs in a like manner to the CDMA system 100.

The IRGS 300 is accessed between the CDMA network 110 and the GSM network 210, and performs a signal conversion in order for signals to be exchanged between the networks 110 and 210.

The IRGS 300 functions as the HLR to manage the profiles of the GSM SIM subscribers from the viewpoint of the CDMA system 100, and functions as the VLR in order for the GSM system 200 to read the location of the roaming GSM SIM subscriber via the IRGS 300 from the viewpoint of the GSM system 200.

In order to transmit and receive the data required by the GSM system 200 to/from the BSS 140, additional functions are necessary for the CDMA terminal 150 that accommodates the GSM SIM.

Among the additional functions, one function is to use a CDMA data burst message so as to provide the GSM system 200 with the data that are necessary for authentication of the user when registering the roaming service subscriber's location. By using the CDMA data burst channel, modification of the present network is minimized and the subscriber can be accommodated.

Short messages are transmitted via the CDMA data burst channel, and the CDMA data burst message can use all the CDMA wireless channels, and any channel can transmit and receive the data without modification of the network.

According to the preferred embodiments of the present invention, an operation for a GSM service subscriber to install his SIM card into the CDMA terminal and use the same in the CDMA service area will be described.

First, a process for the GSM service subscriber to move in a CDMA service area, install the SIM card and attempt to register his location will now be described.

The location registration process can be implemented by two methods.

The first method is to use the international mobile subscriber identity (IMSI) number system used in the GSM system 200 to access the CDMA system 100.

The present Korean number system is the mobile identity number (MIN) system. In order to use the GSM SIM, the IMSI number should be applied to the CDMA system 100. Hence, on a premise that the CDMA system 100 uses the IMSI, the location registration to the GSM system 200 is possible using the CDMA data burst message.

The second method is not to use the IMSI number system, but rather to use the MIN in the CDMA system 100.

In this case, since the IMSI cannot be directly used, a reserved MIN (which will be referred to as a temporary MIN (TMIN) hereinafter) which can be used in the CDMA system 100 is provided to the IMSI, a registration process is performed using the TMIN, and a call is connected.

Figure 2:
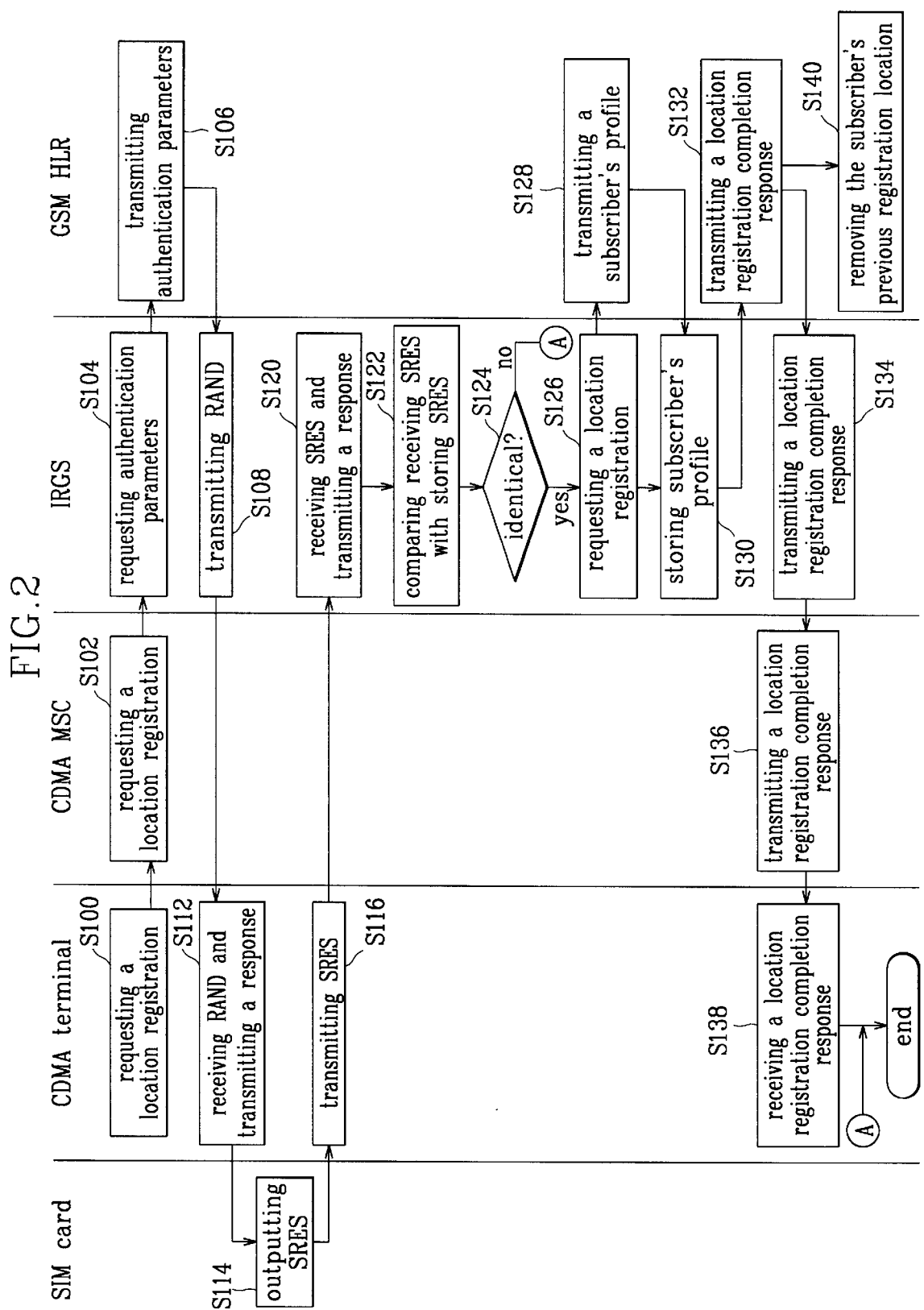
FIG. 2 shows a flow chart of a method for registering the location of the subscriber who uses the SIM card in the CDMA service area according to the first preferred embodiment of the present invention.
Figure 3:
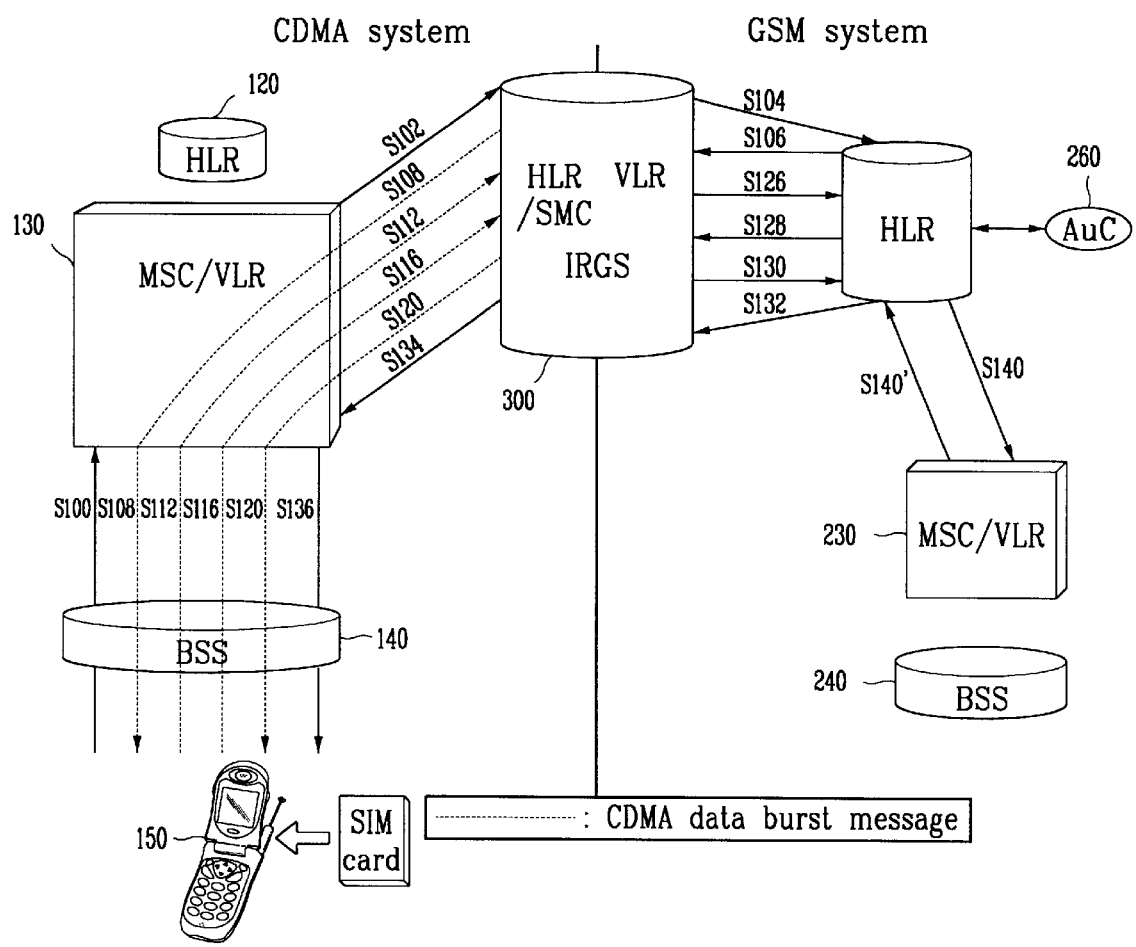
FIG. 3 shows a schematic diagram for illustrating the method for registering the location of the subscriber of FIG. 2 using the roaming service system of FIG. 1.

Referring to FIGS. 2 and 3, a first preferred embodiment for attempting to register the location according to the first method will be described.

First, in the case the GSM SIM subscriber roams to the CDMA system 100 and installs a SIM card into the CDMA terminal 150, the CDMA terminal requests a location registration of the subscriber in step S100. That is, when the SIM card is installed in the CDMA terminal 150, the CDMA terminal 150 reads a state that the SIM card is installed, reads necessary information and the IMSI from the subscriber's profile stored in the SIM card and transmits the same to the BSS 140, and the BSS 140 transmits corresponding information to the MSC 130 to request a location registration.

Next, when receiving the location registration request from the CDMA terminal 150, the MSC 130 requests a location registration from the IRGS 300 in step S102. That is, the MSC 130 receives information including the IMSI transmitted by the CDMA terminal 150 via the BSS 140 and transmits the same to the IRGS 300 in order for the location registration request from the CDMA terminal 150 to be transmitted to the IRGS 300. At this time, the MSC 130 recognizes that the subscriber's HLR is the IRGS 300 via the IMSI transmitted by the CDMA terminal 150.

Since the subscriber who requests the location registration is a GSM service subscriber, the IRGS 300 for receiving the location registration request reads that as a subscriber authentication request from the GSM system 200 and requests authentication parameters from the HLR 220 of the GSM system 200 in step S104. That is, the IRGS 300 requests the authentication parameters from the corresponding HLR 220 using the IMSI received from the MSC 130.

The HLR 220 that receives the authentication parameters from the IRGS 300 transmits the authentication parameters provided by the AuC 260 to the IRGS 300 in step S106. That is, the HLR 220 of the GSM system 200 transmits the authentication parameters obtained by the AuC 260, which are a result value SRES and a random number RAND which is the initial value of an authentication algorithm to the IRGS 300.

When receiving the authentication parameter from the HLR 220 of the GSM system 200, the IRGS 300 transmits the RAND to the CDMA terminal 150 via the CDMA data burst message in step S108. The modification of the CDMA system 100 can be minimized using the CDMA data burst message so as to transmit the RAND.

At this time, the CDMA terminal 150 transmits a response that reports a receipt of the RAND to the IRGS 300 using the CDMA data burst message and accordingly, the IRGS 300 can check that the RAND transmitted by the IRGS 300 is transmitted to the CDMA terminal 150 in step S112.

Next, the CDMA terminal 150 transmits the received RAND to the is SIM card installed in the CDMA terminal 150, and the SIM card executes an authentication algorithm identical with the AuC 260 of the GSM system 200 using the RAND, computes the result value SRES in step S114, and transmits the SRES to the CDMA terminal 150, and the CDMA terminal 150 transmits the SRES to the IRGS 300 using the CDMA data burst message in step S116.

After receiving the SRES from the CDMA terminal 150, the IRGS 300 transmits a receipt response to the CDMA terminal 150 using the CDMA data burst message so as to report that the SRES transmitted by the CDMA terminal 150 is finally transmitted to the IRGS 300 in step Si 20

The IRGS 300 compares the SRES transmitted by the HLR 220 of the GSM system 200 with the SRES computed by the SIM card in step S122, and when the two values are not identical, the user is not a correct user, and then a location registration failure is reported to the CDMA terminal 150 and the location registration process is terminated.

If the two values are identical in step S124, the IRGS 300 determines that the subscriber who requests the location registration is a legitimate subscriber and requests a location registration from the HLR 220 of the GSM system 200 in step S126.

Next, the HLR 220 transmits a profile of the corresponding subscriber to the IRGS 300 in step S128. That is, the HLR 220 reads the IRGS 300 as the VLR of the GSM system 200 and stores the location of the corresponding roaming service subscriber as IRGS 300, and transmits the profile of the present subscriber to the IRGS 300 so as to provide service to the corresponding roaming service subscriber.

The IRGS responds to the receipt of the subscriber's profile transmitted by the HLR 220 and stores the corresponding profile in step S130. At this time, when the IRGS 300 transmits a response on the receipt of the profile to the HLR 220 of the GSM system 200, the HLR 220 receives the response to the transmission of the subscriber's profile and transmits a location registration completion response to the IRGS 300 in step S132, and the IRGS 300 transmits the location registration completion response to the MSC 130 of the CDMA system 100 again in step S134, and the corresponding MSC 130 transmits the location registration completion response to the CDMA terminal 150 in step S136, and therefore a location registration of the GSM service subscriber in the CDMA service area is completed.

At this time, the HLR 220 of the GSM system 200 must remove the location that was previously registered before the roaming service subscriber starts to roam in the CDMA service area in step S140. That is, the HLR 220 requests a removal of the location of the subscriber registered before the roaming to the CDMA service area from the VLR in the MSC 230 of the GSM system 200, and the VLR in the MSC 230 removes the previous location of the corresponding subscriber in step S140.

Figure 4:
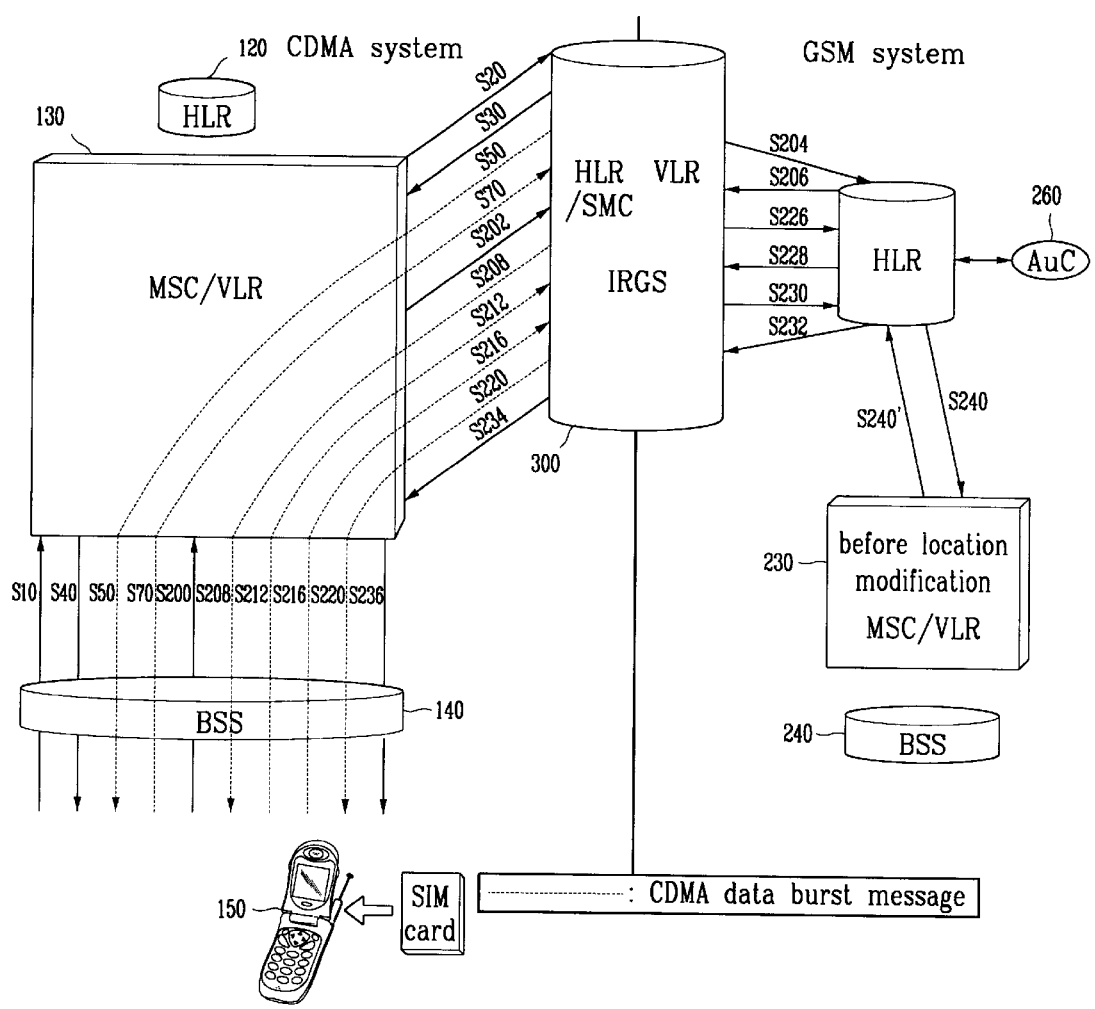
FIG. 4 shows a schematic diagram of a method for registering the location of the roaming service subscriber who uses the SIM card in the CDMA service area using the roaming service system of FIG. 1 according to a second preferred embodiment of the present invention.

Next, referring to FIG. 4, a second preferred embodiment for attempting a location registration according to the second method will be described.

Location registration steps different from those of the first preferred embodiment will be described.

Here, since the CDMA system 100 does not support the IMSI number system installed in the SIM card, the IMSI cannot be used, and in the case a GSM roaming service subscriber installs a SIM Card in the CDMA terminal 150, the CDMA terminal 150 reads necessary information including the IMSI from the SIM card and transmits the information to the MSC 130 via the BSS 140 of the CDMA system 100 in step S10.

The MSC 130 of the CDMA system 100 transmits information including the IMSI transmitted by the CDMA terminal 150 to the IRGS 300 in step S20, and the IRGS 300 transmits a response of the corresponding information receipt to the MSC 130 in step S30, and the MSC 130 transmits the corresponding information receipt response to the CDMA terminal 150 in step S40.

Next, the IRGS 300 provides the TMIN corresponding to the information including the IMSI to the CDMA terminal 150 using the CDMA data burst message in step S50. At this time, in the case the TMIN corresponding to the received IMSI is stored in the IRGS 300 and the TMIN is subsequently received, the IMSI stored in correspondence to the corresponding TMIN is used to communicate with the GSM system 200.

The CDMA terminal 150 that receives the TMIN from the IRGS 300 transmits the TMIN receipt response to the IRGS 300 using the CDMA data burst message and stores the corresponding TMIN in step S70. The CDMA terminal 150 receives the roaming service using the TMIN provided by the IRGS 300.

Subsequent location registration processes are identical with those of the first preferred embodiment, but one difference is that in the first preferred embodiment, the IMSI is used in the process of transmission from the CDMA terminal 150 to the IRGS 300, and as opposed to the second preferred embodiment, the TMIN provided by the IRGS 300 is used instead.

In further detail, the CDMA terminal 150 transmits a location registration request on the GSM service subscriber to the MSC 130 of the CDMA system 100. That is, the CDMA terminal 150 transmits the stored TMIN to the MSC 130 via the BSS 140 of the CDMA system 100 in order to request the location registration.

Next, the MSC 130 requests the location registration from the IRGS 300 instep S202. That is, the MSC 130 of the CDMA system 100 receives the TMIN transmitted by the CDMA terminal 150 via the BSS 140 and transmits the same to the IRGS 300 so that the location registration request is transmitted to the IRGS 300 from the CDMA terminal 150.

Since the subscriber who requests the location registration is a GSM service subscriber, the IRGS 300 that receives the location registration request perceives that a subscriber authentication on the GSM system 200 is necessary and requests an authentication parameter from the HLR 220 of the GSM system 200 in step S204. That is, the IRGS 300 requests an authentication parameter from the corresponding HLR 220 using the IMSI corresponding to the TMIN transmitted by the MSC 130 of the CDMA system 100.

Subsequent steps S106, S108, S110, S112 and S114 of the first preferred embodiment are identical with the steps S206, S208, S210, S212 and S214 of the second preferred embodiment.

Next, subsequent steps S216, S218 and S220 are identical with the steps S116, S118 and S120 of the first preferred embodiment excluding that the TMIN is used instead of the IMSI.

Next, subsequent steps S222, S224, S226, S228, S230, S232, S234, S236, S238, S240 and S240' are identical with the steps S122, S124, S126, S128, S130, S132, S134, S136, S138, S140 and S140' of the first preferred embodiment so that the location registration of the GSM service subscriber in the CDMA service area is completed.

Figure 5A:
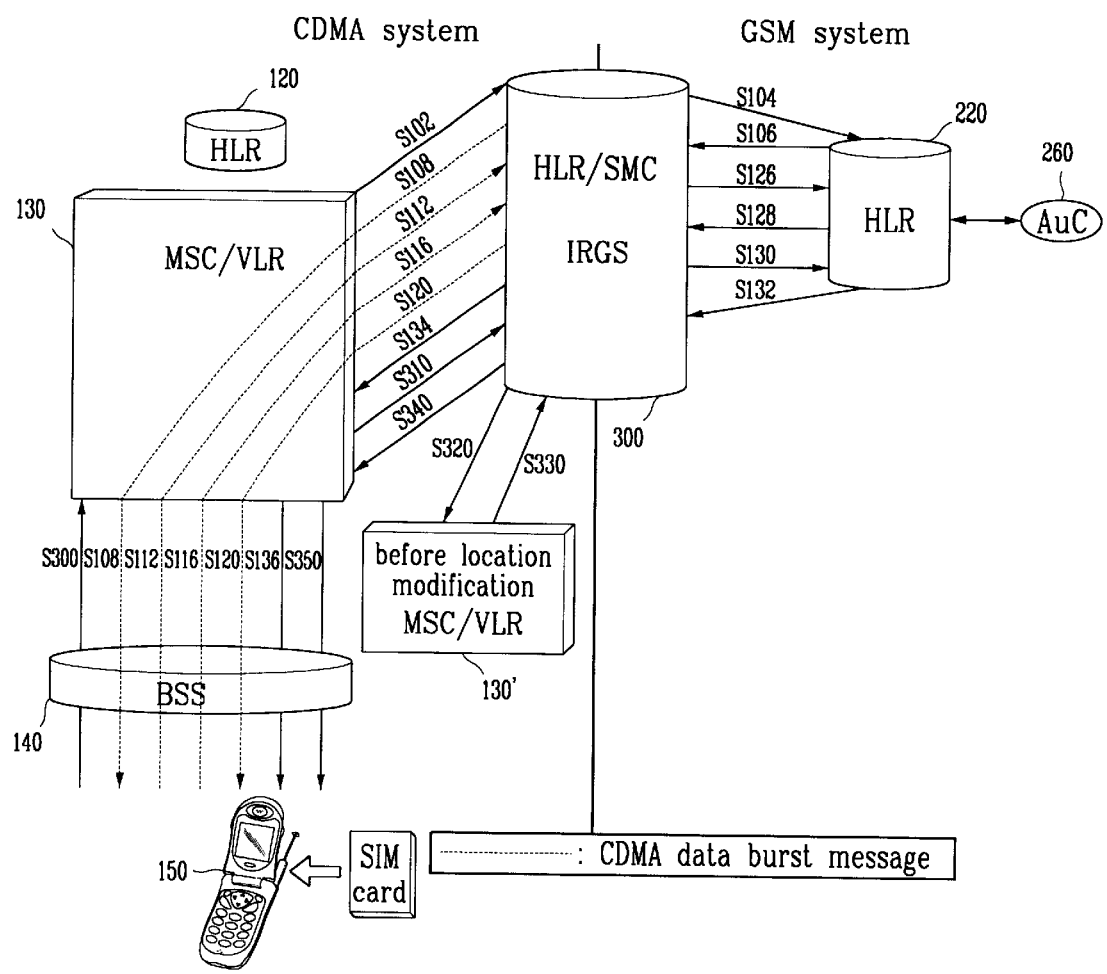
FIG. 5 shows a schematic diagram of a method for registering the location of the roaming service subscriber who uses the SIM card in the CDMA service area when changing the location of the subscriber using the roaming service system of FIG. 1 according to a third preferred embodiment of the present invention, FIG. 5(a) showing a case when the international mobile subscriber identity (IMSI) is used and FIG. 5(b) showing another case when a TMIN is used.
Figure 5B:
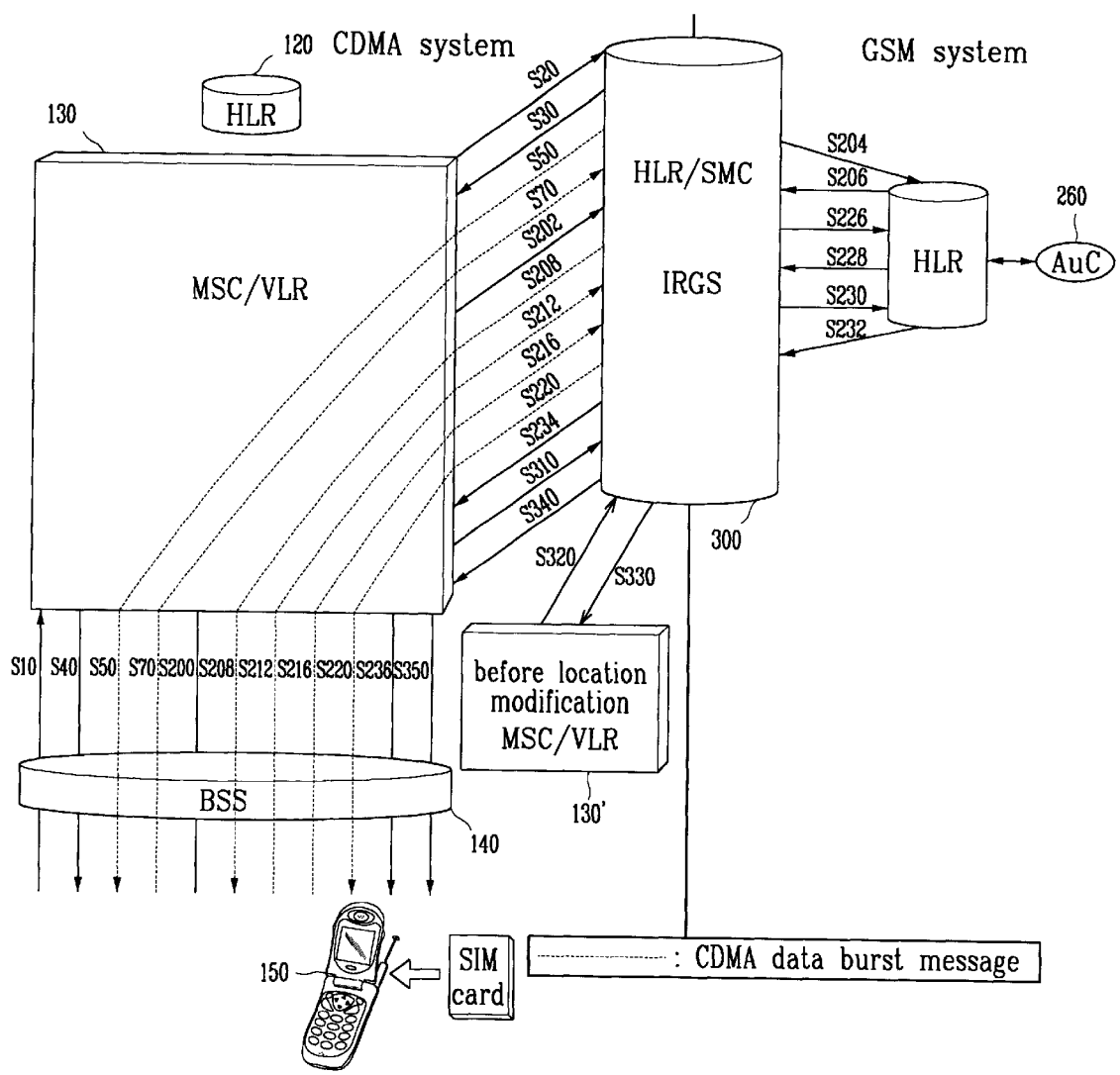

Next, referring to FIGS. 5(a) and 5(b), a third preferred embodiment for a GSM subscriber to attempt to register a location when modifying the location in the CDMA service area will now be described.

After the initial location registration of the GSM subscriber is completed in a like manner to the first and second preferred embodiments, the location of the home subscriber is modified in an identical manner to the subscriber of the CDMA system 100. At this time, in order to manage the modification and registration of the location, the IRGS 300 functions as the HLR of the CDMA system 100. Also, in the viewpoint of the GSM system 200, when the roaming service subscriber modifies the location in the CDMA system 100, the subscriber's location is always IRGS 300.

In the case of using the method of the first preferred embodiment, the IMSI is used, and in the case of using the method of the second preferred embodiment, the TMIN is used instead of the IMSI.

First, when a roaming service subscriber requests a location registration caused by a location modification to the MSC 130 of the CDMA system 100 via the BSS 140 in step S300, the corresponding MSC 130 authenticates the roaming service subscriber who requests the location registration. In the case of using the IMSI, the above-noted authentication process is identical with the steps S102 to S136 of the location registration of the first preferred embodiment, referring to FIGS. 2 and 3, and in the case of using the TMIN, the above-noted authentication process is identical with the steps S20 to S236 of the location registration of the second preferred embodiment, referring to FIG. 4.

That is, the steps from S102 to S136 in the case of using the IMSI and the steps from S20 to S236 in the case of using the TMIN are respectively performed as the authentication process in the preferred embodiments. This authentication process is optional according to system designs, but it is preferable to include this authentication process. Therefore, the authentication process using the IMSI is described in FIG. 5(a), and that using the TMIN in FIG. 5(b).

After the completion of the authentication process, the MSC 130 of the CDMA system 100 transmits the IMSI or the TMIN of the CDMA terminal 150 that requires the location registration to the IRGS 300 so as to request a location update registration in step S310.

After receiving the location update registration request from the corresponding MSC 130, the IRGS 300 requests the location removal of the VLR in the MSC 130' of the CDMA system 100 that stores the location of the roaming service subscriber before the subscriber's location modification in the CDMA system 100 in step S320, and the VLR in the MSC 130' before the location modification removes the corresponding location and transmits a removal completion response to the IRGS 300 in step S330, and the IRGS 300 transmits the corresponding location removal completion response to the CDMA terminal 150 via the MSC 130 and the BSS 140 of the CDMA system 100 so as to report a completion of the location update registration caused by the location modification of the roaming service subscriber in steps S340 and S350.

At this time, since the home GSM system 200 reads the location of the roaming service subscriber with the IRGS 300, the HLR 220 of the GSM system is indifferent.

Figure 6:
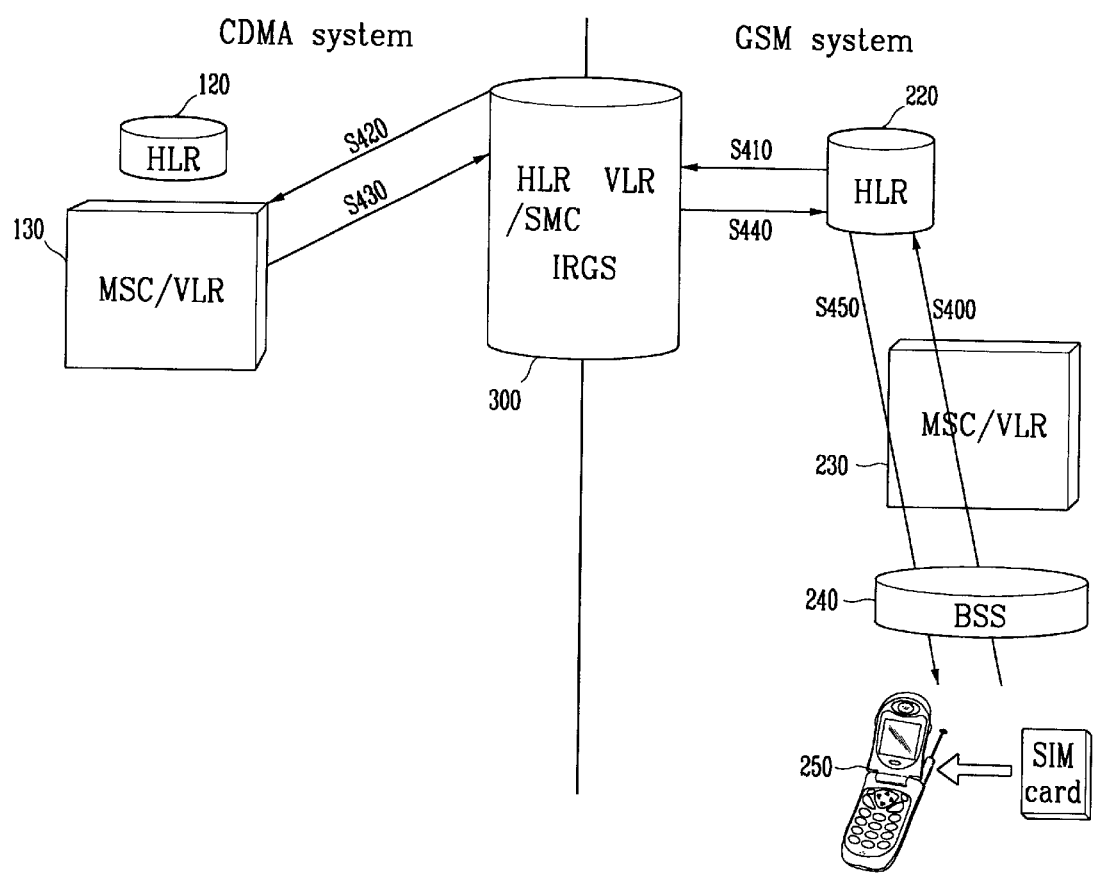
FIG. 6 shows a schematic diagram of a method for registering the location of the roaming service subscriber when the subscriber who uses the SIM card in the CDMA service area returns to a home GSM service area using the roaming service system of FIG. 1 according to a fourth preferred embodiment of the present invention.

Referring to FIG. 6, a fourth preferred embodiment for attempting a location registration when a GSM subscriber uses a roaming service in the CDMA service area and returns to the home GSM service area will be described.

In the case the GSM subscriber leaves the CDMA service area and returns to the home GSM service area, the location of the roaming service subscriber must be updated to the location in the GSM service area, and therefore the location of the IRGS 300 that functions as the HLR of the CDMA system 100 is removed, and the HLR 220 of the GSM system 200 is updated. At this time, the conventional location registration process performed by the GSM system 200 is executed, and the IRGS 300 converts the location removal message of the GSM system 200 into a location removal message of the CDMA system 100 and performs the above process.

First, when the subscriber who returns to the home GSM service area requests a location update to the HLR 220 via the MSC 230 of the GSM system 200, the corresponding HLR 220 requests a location removal of the corresponding subscriber to the IRGS 300 that performs the VLR function of the GSM system 200 in step S410.

Next, the IRGS 300 that receives the location removal from the HLR 220 requests the location removal to the VLR 130 of the CDMA system 100 in step S420. At this time, in the case of using the TMIN in a like manner to the second preferred embodiment, the IRGS 300 requests the removal of the TMIN corresponding to the IMSI to the VLR 130.

The VLR 130 of the CDMA system 100 removes the location of the corresponding subscriber according to the request of the IRGS 300 and transmits a removal completion response to the IRGS 300 in step S430.

The IRGS 300 that receives the location removal completion response from the VLR 130 of the CDMA system 100 transmits the corresponding location removal completion response to the HLR 220 of the GSM system 200, and in the case of using the TMIN in a like manner to the second preferred embodiment, releases the TMIN corresponding to the IMSI in step S440.

The HLR 220 that receives the location removal completion response from the IRGS 300 transmits the location removal completion response to the GSM terminal 250 via the MSC 230 and BSS 240 of the GSM system 200 so as to report that the location update registration caused by the GSM subscriber's return from the CDMA service area is completed in step S450.

A process for a roaming service subscriber to call in the CDMA service area will be described.

Figure 7:
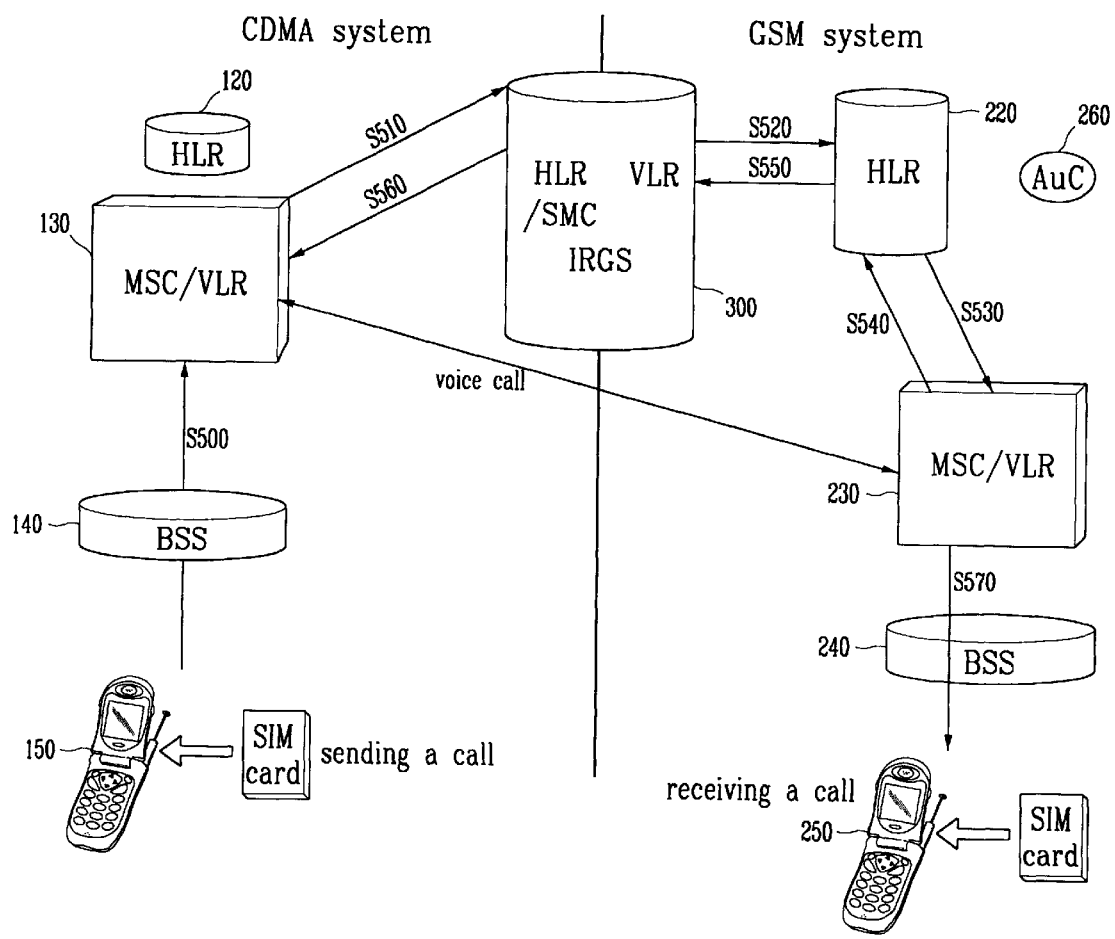
FIG. 7 shows a schematic diagram of a process for a roaming service subscriber who uses the SIM card in the CDMA service area to transmit a message to a GSM service subscriber who stays at a home GSM service area using the roaming service system of FIG. 1 according to a fifth preferred embodiment of the present invention.

Referring to FIG. 7, a fifth preferred embodiment for a roaming service subscriber to call a GSM subscriber who stays in the home GSM service area will be described.

At this time, in the case of using the method of the first preferred embodiment, the IMSI is used, and in the case of using the method of the second preferred embodiment, the TMIN is used.

First, when the roaming service subscriber requests a voice call transmission from the MSC 130 via the BSS 140 of the CDMA system using the CDMA terminal 150 in step S500, the MSC 130 of the CDMA system 100 authenticates the corresponding roaming service subscriber. In the case of using the IMSI, this authentication process is executed via the location registration process S102 to S136 in a like manner to the first preferred embodiment with reference to FIGS. 2 and 3, and in the case of using the TMIN, this authentication process is executed via the location registration process S20 to S236 in a like manner to the second preferred embodiment with reference to FIG. 4, and since this process is applied in the identical manner of the third preferred embodiment referring to FIGS. 5(*a*) and (*b*), no further description will be provided. At this time, in the fifth preferred embodiment, one difference is that the steps S102 and S202 are those for an authentication request to the roaming service subscriber and not for the location registration request of the first, second and third preferred embodiments.

Therefore, the steps from S102 to S136 in the case of using the IMSI, and the steps from S20 to S236 are executed as the authentication process in the preferred embodiment, and this authentication process is optional, but it is preferable to include this authentication process. Since the authentication process can be easily understood referring to FIGS. 5(*a*) and 5(*b*) referred to in the third preferred embodiment, a process of using the IMSI excluding the above-noted authentication process for ease of explanation is described in FIG. 7.

After the completion of the authentication process, the MSC 130 of the CDMA system 10 requests receipt routing information needed for a call setting, that is, location information of the receipt terminal to the IRGS 300 in step S510.

The IRGS 300 that receives receipt routing information from the MSC 130 of the CDMA system 100 reads that the call-receiving subscriber is the GSM service subscriber, and requests receipt routing information from the HLR 220 of the GSM system 200 in step S520. At this time, the IRGS 300 converts the receipt routing information request message of the CDMA system 100 into a message of the GSM system 200 and transmits the same to the HLR 220.

The HLR 220 of the GSM system 200 transmits the routing information to the IRGS 300 in step S550, and the IRGS 300 converts the routing information into routing information of the CDMA system 100 and transmits the same to the MSC 130 in step S560.

The MSC 130 reads that the location of the receiver is the MSC 230 of the GSM system 200 via corresponding routing information, and is then directly connected to the corresponding MSC 230 so as to make a voice call in step S570.

Figure 8:
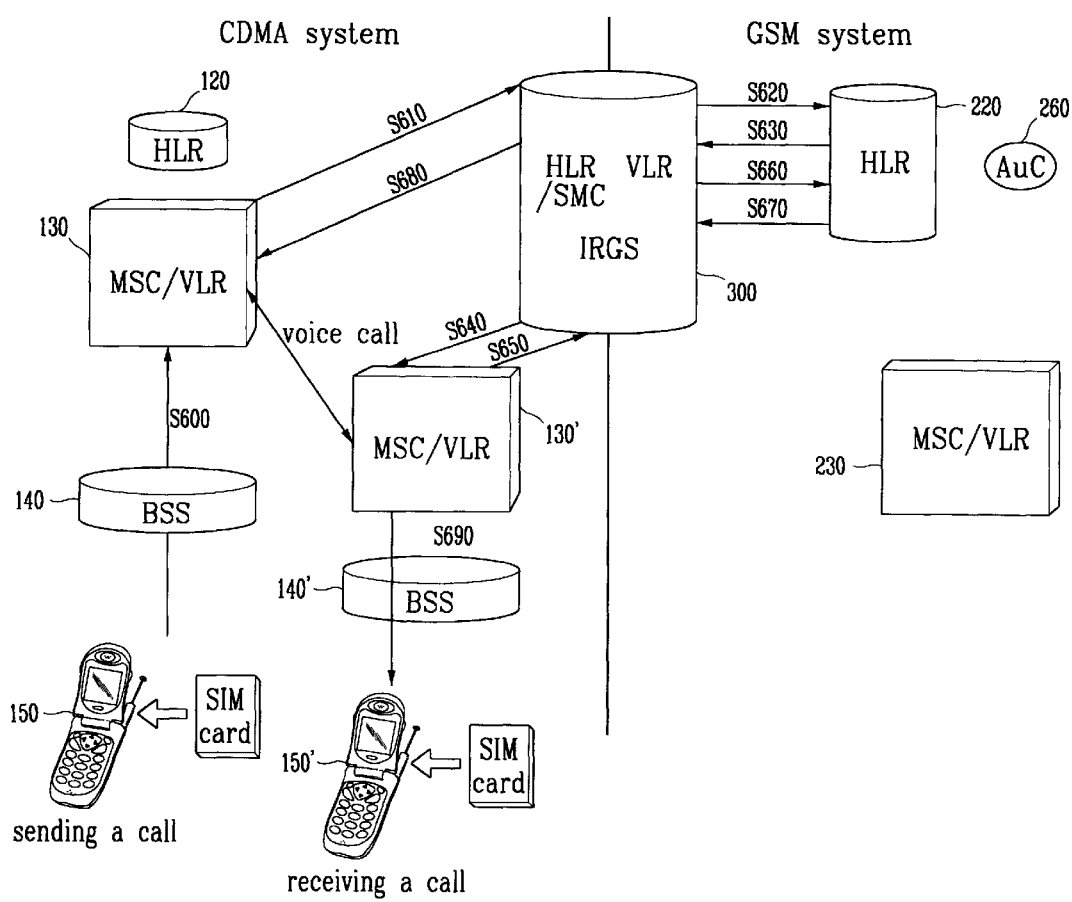
FIG. 8 shows a schematic diagram of a process for a first roaming service subscriber who uses the SIM card in the CDMA service area to transmit a message to a second roaming service subscriber using the roaming service system of FIG. 1 according to a sixth preferred embodiment of the present invention.

Referring to FIG. 8, a sixth preferred embodiment for a roaming service subscriber to call another roaming service subscriber in the CDMA service area will be described.

First, when a roaming service subscriber requests a voice call transmission from the MSC 130 using the CDMA terminal 150 via the BSS 140 of the CDMA system 100 in step S600, the MSC 130 authenticates the corresponding roaming service subscriber. This authentication process is identical with that of the third preferred embodiment. That is, the steps S102 to S136 in the case of using the IMSI, and the steps S20 to S236 in the case of using the TMIN are performed as the authentication process. At this time, this authentication process is optional, but it is preferable to include this authentication process. Since the authentication process can be easily understood referring to FIGS. 5(*a*) and 5(*b*) referred to for the third preferred embodiment, a process of using the IMSI excluding the above-noted authentication process for ease of explanation is described in FIG. 8.

After the completion of the authentication process, the MSC 130 of the CDMA system 10 requests receipt routing information needed for a call setting, that is, location information of the receipt terminal from the IRGS 300 in step S610.

The IRGS 300 that receives receipt routing information from the MSC 130 reads that the call-receiving subscriber is a GSM service subscriber, and requests receipt routing information from the HLR 220 of the GSM system 200 in step S620. At this time, the IRGS 300 converts the receipt routing information request message of the CDMA system 100 into a message of the GSM system 200 and transmits the same to the HLR 220.

The HLR 220 of the GSM system 200 reads that the corresponding VLR is set as the IRGS 300, requests the corresponding routing information from the IRGS 300 in step S630, and the IRGS 300, that is, the corresponding VLR, requests routing information from another VLR 130' of the corresponding CDMA system 100.

The VLR 130' of the CDMA system 100 performs a step of authenticating another roaming service subscriber who uses the receipt terminal 150' before the step S610. This authentication step is identical with the authentication step performed before the step S610, but one difference is that the authentication process is for another roaming service subscriber who uses the receipt terminal 150'. That is, the steps S102 to Si 36 in the case of using the IMSI, and the steps S20 to S236 in the case of using the TMIN are performed as the authentication process. At this time, this authentication process is optional, but it is preferable to include this authentication process. Since the authentication process can be easily understood referring to FIGS. 5(a) and 5(b) referred to for the third preferred embodiment, a process of using the IMSI excluding the above-noted authentication process for ease of explanation is described in FIG. 8.

After the other roaming service subscriber who uses the receipt terminal 150' is authenticated, the VLR 130' of the CDMA system 100 transmits routing information of the receipt roaming terminal to the IRGS 300 in step S650, and the IRGS 300 converts the routing information provided by the VLR 130' of the CDMA system 100 into routing information of the GSM system 200 and transmits the same to the HLR 220 of the GSM system 200 in step S660.

At this time, the method according to the second preferred embodiment requests routing information of the TMIN corresponding to the IMSI.

Next, the HLR 220 of the GSM system 200 that receives routing information from the IRGS 300 transmits the routing information to the IRGS 300 again in step S670, and the IRGS 300 converts the routing information into routing information of the CDMA system 100 and transmits the same to the MSC 130 of the CDMA system 100 in step S680. As described above, in the case the IRGS 300 knows the call-receiving subscriber's routing information, a retransmission process is performed so as to not to make the call process of the GSM system 200 be changed.

After this, through the corresponding routing information, the MSC 130 that receives routing information knows that the location of the receiver is that of another roaming service subscriber and can access the other subscriber via the MSC 130' of the CDMA system 100, and directly access the corresponding MSC 130' so as to generate a voice call in step S690.

Figure 9:
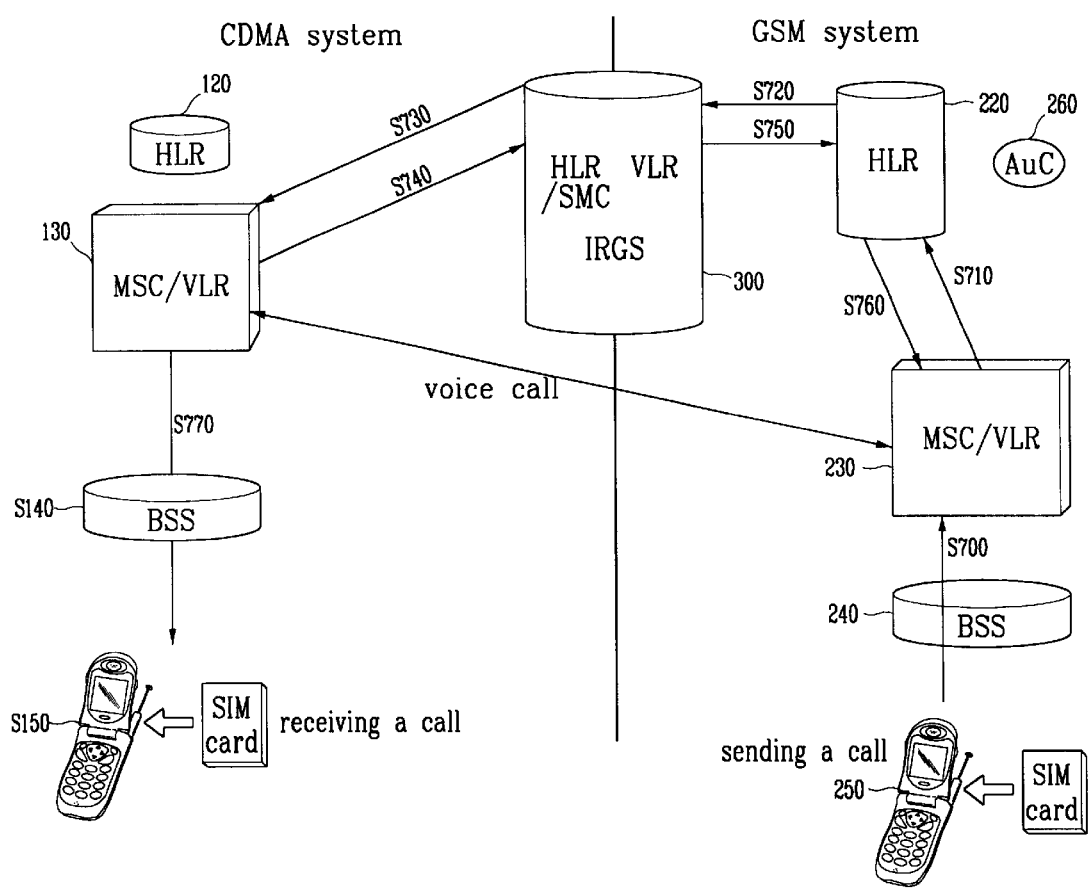
FIG. 9 shows a schematic diagram of a process for a roaming service subscriber who uses the SIM card in the CDMA service area to receive a message from a GSM service subscriber who stays at a home GSM service area using the roaming service system of FIG. 1 according to a seventh preferred embodiment of the present invention.

Referring to FIG. 9, a seventh preferred embodiment for a roaming service subscriber to receive a call in the CDMA service area will now be described.

Here, a case in which a roaming service subscriber receives a call from a subscriber who stays in the home GSM service area will be described, and a case when a roaming service subscriber receives a call from another subscriber who stays in the CDMA service area will not be described since it can be easily understood referring to the sixth preferred embodiment.

First, when a subscriber who stays in the GSM service area uses a GSM terminal 250 and requests a voice call transmission from the MSC 230 via the BSS 240 of the GSM system 200 in step S700, the MSC 230 of the GSM system 200 requests receipt routing information needed for a call setting, that is, location information of the receipt terminal from the HLR 220 of the GSM system 200 in step S710.

The HLR 220 that receives the receipt routing information request from the MSC 230 of the GSM system 200 requests receipt routing information from the IRGS 300 known as the VLR of the corresponding roaming service subscriber in step S720, and the IRGS 300 requests routing information from the corresponding VLR 130 of the CDMA system 100 in step S730.

The VLR 130 that receiving the routing information request from the IRGS 300 authenticates the roaming service subscriber who uses the receipt CDMA terminal 150. This authentication process is performed identically with that of the sixth preferred embodiment. That is, the steps S102 to S136 in the case of using the IMSI, and the steps S20 to S236 in the case of using the TMIN are performed as the authentication process. At this time, this authentication process is optional, but it is preferable to include this authentication process. Since the authentication process can be easily understood referring to FIGS. 5(a) and 5(b) referred to for the third preferred embodiment, a process of using the IMSI excluding the above-noted authentication process for ease of explanation is described in FIG. 9.

As described above, after the completion of the authentication to the roaming service subscriber who uses the receipt terminal 150, the VLR 130 of the CDMA system 100 transmits corresponding routing information to the IRGS 300 in step S740, and the IRGS 300 converts the routing information into routing information of the GSM system 200 and transmits the same to the HLR 220 of the GSM system 200 in step S750.

At this time, the method according to the second preferred embodiment requests routing information of the TMIN corresponding to the IMSI.

After this, the HLR 220 of the GSM system 200 transmits the corresponding routing information provided by the IRGS 300 to the MSC 230 of the GSM system 200 in step S760, and the corresponding MSC 230 reads that the location of the receiver is the MSC 130 of the CDMA system 100 in the CDMA service area, and directly accesses the corresponding MSC 130 so as to make a voice call in step S770.

Next, a short message service (SMS) of the roaming service subscriber will be described.

Regarding the SMS, the IRGS 300 functions as the SMC so as to transmit and receive messages and process the same.

Figure 10:
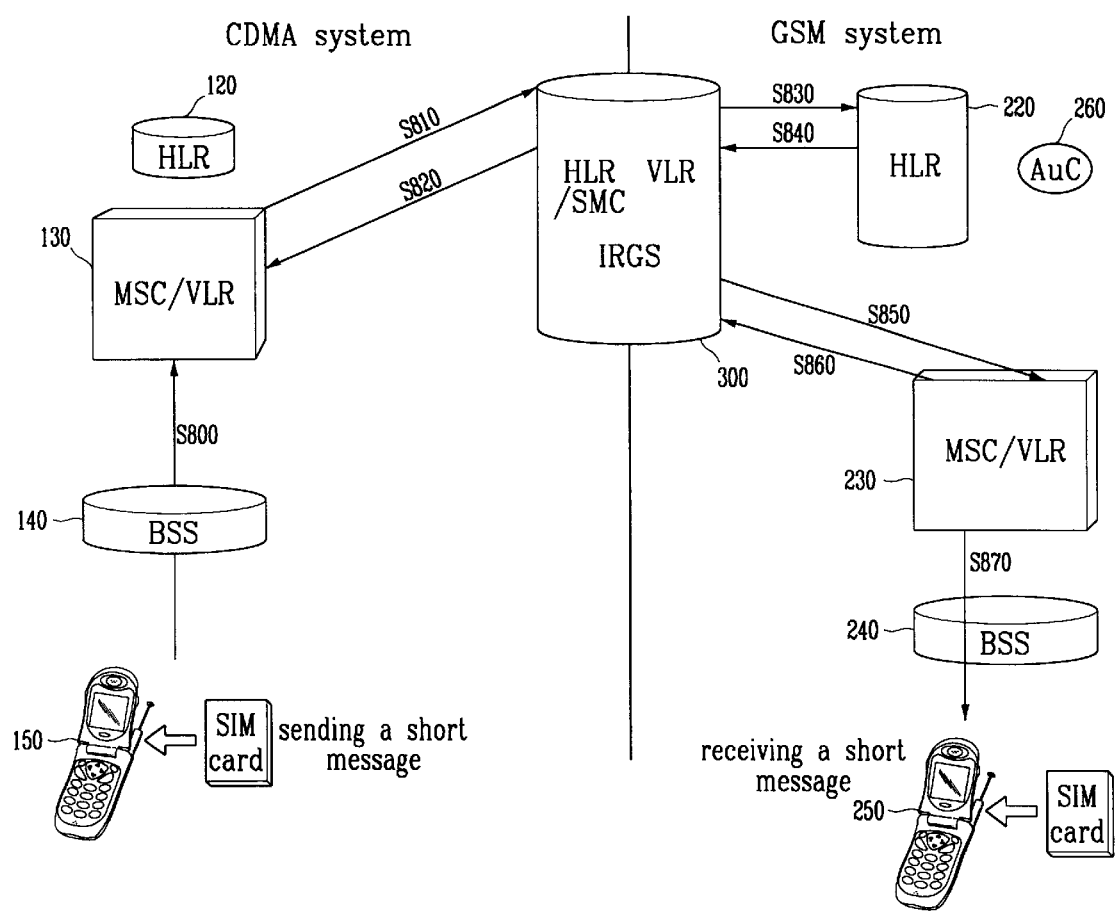
FIG. 10 shows a schematic diagram of a process for a roaming service subscriber who uses the SIM card in the CDMA service area to transmit a short message to a subscriber who stays at a home GSM service area using the roaming service system of FIG. 1 according to an eighth preferred embodiment of the present invention.

Referring to FIG. 10, an eighth preferred embodiment for a roaming service subscriber to send a short message to a GSM service subscriber who stays in the home GSM service area will now be described.

When the roaming service subscriber in the CDMA service area requests short message-sending using the CDMA terminal 150 in step S800, the BSS 140 and MSC 130 of the CDMA system 100 receive the short message from the CDMA terminal 150 and deliver the same to the IRGS 300 in step S810.

When receiving the short message from the MSC 130 of the CDMA system, the IRGS 300 functioning as the SMC transmits a receiving completion response to the MSC 130 in step S820 and requests location information on the receipt terminal from the HLR 220 of the GSM system 200 in step S830.

The HLR 220 that receives the location information request from the IRGS 300 transmits the location information of the receipt terminal to the IRGS 300 in step S840, and the IRGS 300 converts the short message into a GSM system format message and transmits the same to the MSC 230 of the GSM system 200 corresponding to the location information transmitted by the HLR 220 of the GSM system 200 in step S850.

After this, the MSC 230 that receives the message from the IRGS 300 transmits a message receipt completion response to the IRGS 300 in step S860 and transmits the corresponding short message to the GSM terminal 250 via the BSS 240 in step S870.

Figure 11:
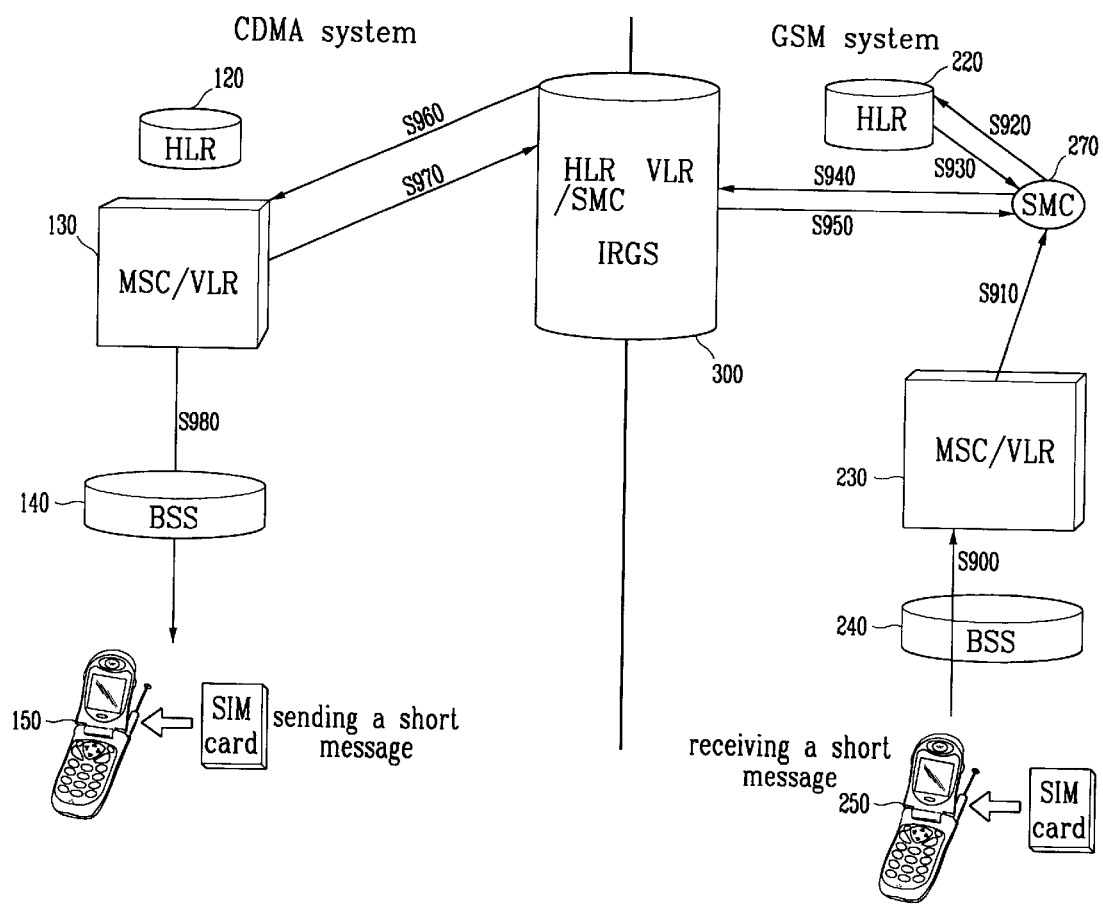
FIG. 11 shows a schematic diagram of a process for a roaming service subscriber who uses the SIM card in the CDMA service area to receive a short message from a subscriber who stays at a home GSM service area using the roaming service system of FIG. 1 according to a ninth preferred embodiment of the present invention.

Next, referring to FIG. 11, a ninth preferred embodiment for a roaming service subscriber to receive a short message from a subscriber who stays in the GSM service area will now be described.

First, the subscriber in the GSM service area requests a short message-sending using the GSM terminal 250, the MSC 230 of the GSM system 220 receives the short message from the GSM terminal 250 and transmits the same to the SMC 270 of the GSM system 200 in step S910.

When receiving the short message from the MSC 230 of the GSM system 200, the SMC 270 transmits the location information request of the receipt terminal to the HLR 220 of the GSM system 200 in step S920.

The HLR 220 that receives the location information request from the SMC 270 transmits the location information of the receipt terminal to the SMC 280 in step S930, and the SMC 270 transmits the previously received short message to the IRGS that functions as the SMC of the CDMA system in step S940. At this time, the IRGS 300 transmits a short message receipt completion response to the SMC 270 in step S950.

After this, the IRGS 300 converts the short message into a CDMA system 100 type message and transmits the same to the MSC 130 of the CDMA system 100 in step S960, and the MSC 130 transmits a message receipt completion response to the IRGS 300 in step S970 and transmits the corresponding short message to the CDMA terminal 150 via the BSS 140 of the CDMA system 100 in step S980.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, processes for a roaming service subscriber to send/receive a short message to/from another roaming service subscriber are not described, but persons skilled in the art can easily understand these processes when referring to above-mentioned various embodiments.

Also, a subscriber can install a UIM card in a GSM terminal and receive the roaming service in the GSM service areas, which will be easily understood by skilled person.

According to the present invention, the GSM service subscriber can use his SIM card and telephone number in the CDMA service area.

Further, by using a CDMA data burst message to register locations in the GSM system, modifications of the conventional networks are minimized and the roaming service to the GSM SIM card is enabled.

What is claimed is:

1. A roaming service system in a code division multiple access (CDMA) service area for a global system for mobile communications (GSM) service subscribers, comprising:
   a CDMA system comprising a CDMA home location register (HLR) storing information on the subscribers' locations and services, a CDMA mobile switching center (MSC) connected to the CDMA HLR and accessing calls, and a CDMA terminal wirelessly connected to the CDMA MSC and capable of having a subscriber identity module (SIM) card removably installed therein;
   a GSM system comprising a GSM HLR storing information on the subscribers' locations and services, a GSM MSC connected to the GSM HLR and accessing calls, an authentication center (AuC) connected to a GSM network and authenticating terminals, and a GSM terminal wirelessly connected to the GSM MSC; and
   an international roaming gateway system (IRGS) connected between the CDMA system and the GSM system and converting signals to execute signal communications between the systems, and when a subscriber of a service provided by the GSM system moves to an area in which the subscriber can use the service provided by the CDMA system and installs the subscriber's SIM card in the CDMA terminal, transmissions of predetermined data necessary for a GSM authentication by the CDMA system being executed using a CDMA message so that a task of initial location registration of the GSM service subscriber, a task of a location registration when the location is modified, a task of sending and receiving calls with other subscribers, and a task of a short message service (SMS) are enabled.

2. The system of claim 1, wherein predetermined data needed for the GSM authentication are transmitted according to a CDMA data burst message transmission.

3. The system of claim 2, wherein the CDMA data burst message is a short message format.

4. The system of claim 1, wherein when the CDMA system supports an international mobile subscriber identity (IMSI) number system stored in the GSM SIM card, the CDMA system uses the IMSI to register a location of the GSM service subscriber.

5. The system of claim 1, wherein when the CDMA system supports a mobile identity number (MIN) system, the CDMA system uses a predetermined temporary MIN (TMIN) corresponding to the IMSI to register the location of the GSM service subscriber.

6. In a method for registering a location when a subscriber of a global system for mobile communications (GSM) system service moves to a code division multiple access (CDMA) system service area and installs a subscriber identity module (SIM) card in a CDMA terminal and roams to the CDMA system service in a system comprising a CDMA system comprising a CDMA mobile switching center (MSC) accessing calls and a CDMA terminal wirelessly connected to the CDMA MSC and capable of having the SIM card removably installed therein; a GSM system comprising a GSM home location register (HLR) storing information on subscribers' locations and services, and an authentication center (AuC) connected to a GSM network and authenticating terminals; and an international roaming gateway system (IRGS) connected between the CDMA system and the GSM system and converting signals to execute signal communications between the CDMA and GSM systems, a method for registering a location when a GSM service subscriber roams to the CDMA service, comprising:
   (a) the CDMA terminal requesting a location registration from the CDMA MSC;
   (b) the CDMA MSC, when receiving the location registration request, authenticating the GSM subscriber via the IRGS that transmits data to the CDMA terminal using a CDMA message in cooperation with the GSM system, the data being needed for the GSM authentication; and (c) registering the location of the GSM subscriber via message transmissions between the IRGS and GSM HLR when the authentication of the GSM service subscriber is completed.

7. The method of claim 6, wherein when the CDMA system supports an international mobile subscriber identity (IMSI) number system stored in the GSM SIM card, the CDMA system uses the IMSI to register the location of the GSM service subscriber.

8. The method of claim 6, wherein when the CDMA system supports a mobile identity number (MIN) system, the CDMA system uses a predetermined temporary MIN (TMIN) corresponding to an international mobile subscriber identity (IMSI) number stored in the GSM SIM card to register the location of the GSM service subscriber.

9. The method of claim 8, wherein the TMIN is stored in the IRGS and is managed to correspond to the IMSI of the GSM service subscriber.

10. The method of claim 6, wherein (b) comprises:
the IRGS receiving authentication parameters from the GSM HLR;
the IRGS transmitting a predetermined random number among the authentication parameters to the CDMA terminal;
the CDMA terminal transmitting the random number to the SIM card;
the SIM card outputting an authentication value using the random number and transmitting the authentication value to the CDMA terminal;
the CDMA terminal transmitting the authentication value to the IRGS;
the IRGS comparing the authentication value transmitted by the CDMA terminal with the predetermined authentication value among the authentication parameters transmitted by the GSM HLR; and
completing the authentication of the GSM service subscriber when the two compared values are identical.

11. The method of claim 10, wherein the authentication parameters are generated by an authentication algorithm installed in the AuC when the GSM service subscriber registers the GSM system service.

12. The method of claim 6, wherein (c) comprises:
the IRGS requesting a location registration from the GSM HLR;
the GSM HLR, when receiving the location registration request, transmitting a profile of the GSM service subscriber to the IRGS; and
the IRGS storing the profile and transmitting a location registration completion response to the CDMA terminal.

13. In a method for registering a location when a global system for mobile communications (GSM) service subscriber who has roamed to a code division multiple access (CDMA) service returns to a GSM service area after using the CDMA service in a system comprising a CDMA system comprising a CDMA mobile switching center (MSC) for accessing calls; a GSM system comprising a GSM home location register (HLR) for storing information on subscribers' locations and services and a GSM terminal wirelessly is connected to the GSM HLR; and an international roaming gateway system (IRGS) connected between the CDMA and GSM systems and converting signals so as to execute signal communications between the CDMA and GSM systems, a method for registering a location when a GSM service subscriber who has roamed to the CDMA service returns to the GSM service, comprising:

(a) the GSM terminal requesting a location registration from the GSM HLR because of the roaming service subscriber's return to the GSM service area; and
(b) the GSM HLR, when receiving the location registration request, removing the roaming service subscriber's location stored in the HLR provided in the CDMA MSC and storing information on the returning subscriber according to message communications with the IRGS.

14. The method of claim 13, wherein (b) comprises removing a temporary mobile identity number (TMIN) stored in the IRGS and the CDMA MSC when the CDMA system supports a mobile identity number (MIN) system, and the TMIN corresponding to an international mobile subscriber identity (IMSI) number stored in a GSM SIM card is stored in the IRGS and the CDMA MSC.

15. In a method for a subscriber of a global system for mobile communications (GSM) system service to move to a code division multiple access (CDMA) system service area, install a subscriber identity module (SIM) card in a CDMA terminal, roam to the CDMA system service and then send a call in a system comprising a CDMA system comprising a CDMA mobile switching center (MSC) accessing calls, and a CDMA terminal wirelessly connected to the CDMA MSC and capable of having the SIM card removably installed therein; a GSM system comprising a GSM home location register (HLR) storing information on subscribers' locations and services, and a GSM MSC connected to the GSM HLR and accessing calls; and an international roaming gateway system (IRGS) connected between the CDMA system and the GSM system and converting signals to execute signal communications between the CDMA and GSM systems, a method for processing call-sending of a GSM service subscriber who has roamed to the CDMA service, comprising:

(a) the roaming service subscriber using the CDMA terminal and requesting voice call-sending to the CDMA MSC;
(b) the CDMA MSC, when receiving the voice call-sending request, authenticating the roaming service subscriber via the IRGS that transmits data to the CDMA terminal using a CDMA message in cooperation with the GSM system, the data being needed for the GSM authentication;
(c) the CDMA MSC, when the authentication to the roaming service subscriber is completed, requesting location information of a call-receiving subscriber from the IRGS, the information being needed for voice call setting;
(d) the IRGS, when receiving the location information request of the call-receiving subscriber, obtaining the location information of the call-receiving subscriber via the GSM HLR and transmitting the location information to the CDMA MSC; and
(e) the CDMA MSC being connected to the MSC corresponding to the call-receiving subscriber via the location information of the call-receiving subscriber provided by the IRGS, and connecting a voice call between the roaming service subscriber and the call-receiving subscriber.

16. The method of claim 15, wherein when the call-receiving subscriber of (d) is a GSM service subscriber in the GSM system service area, (d) comprises:
the GSM HLR receiving location information of the call-receiving subscriber from the GSM MSC and transmitting the location information to the IRGS; and the IRGS transmitting the location information to the CDMA MSC.

17. The method of claim 15, wherein when the call-receiving subscriber of (d) is a GSM service subscriber who has roamed to the CDMA service, (d) comprises:
the GSM HLR requesting location information of the call-receiving subscriber from the IRGS;
the IRGS requesting the location information of the call-receiving subscriber from a second CDMA MSC corresponding to the call-receiving subscriber;
the second CDMA MSC, when receiving the call-receiving subscriber location information request, authenticating the GSM subscriber via the IRGS that transmits data to the CDMA terminal of the call-receiving subscriber using a CDMA message in cooperation with the GSM system, the data being needed for the GSM authentication;
the second CDMA MSC, when the authentication of the call-receiving subscriber is completed, obtaining location information of the call-receiving subscriber and transmitting the location information to the GSM HLR via the IRGS;
the GSM HLR transmitting the location information to the IRGS; and
the IRGS transmitting the location information to the CDMA MSC.

18. The method of claim 15, wherein (b) comprises:
the IRGS receiving authentication parameters from the GSM HLR;
the IRGS transmitting a predetermined random number among the authentication parameters to the CDMA terminal of a target authenticated one;
the CDMA terminal transmitting the random number to a built-in SIM card;
the SIM card generating an authentication value by using the random number, and transmitting the authentication value to the CDMA terminal;
the CDMA terminal transmitting the authentication value to the IRGS;
the IRGS comparing the authentication value provided by the CDMA terminal with the predetermined authentication value among the authentication parameters provided by the GSM HLR; and
completing the authentication when the two values are identical according to the comparison results.

19. In a method for a subscriber of a global system for mobile communications (GSM) system service to move to a code division multiple access (CDMA) system service area, install a subscriber identity module (SIM) card in a CDMA terminal, roam to the CDMA system service and then receive a call in a system comprising a CDMA system comprising a CDMA mobile switching center (MSC) accessing calls, and a CDMA terminal wirelessly connected to the CDMA MSC and capable of having the SIM card removably installed therein; a GSM system comprising a GSM home location register (HLR) storing information on subscribers' locations and services, and a GSM MSC connected to the GSM HLR and accessing calls; and an international roaming gateway system (IRGS) connected between the CDMA system and the GSM system and converting signals to execute signal communications between the CDMA and GSM systems, a method for a GSM service subscriber who has roamed to the CDMA service to process call-receiving, comprising:
(a) a predetermined call-sending subscriber using a terminal to request a voice call-sending to the roaming service subscriber;
(b) the MSC corresponding to the call-sending subscriber requesting location information of the roaming service subscriber who is a call receiver from the IRGS;
(c) the IRGS, when receiving the location information request, requesting corresponding location information from the CDMA MSC;
(d) the CDMA MSC, when receiving the location information request, authenticating the roaming service subscriber via the IRGS that transmits data to the CDMA terminal of the roaming service subscriber using a CDMA message in cooperation with the GSM system, the data being needed for the GSM authentication;
(e) the CDMA MSC, when the authentication of the roaming service subscriber is completed, obtaining location information of the roaming service subscriber and transmitting the location information to the MSC corresponding to the call-sending subscriber via the IRGS; and
(f) the MSC being connected to the CDMA MSC corresponding to the roaming service subscriber via the location information of the roaming service subscriber provided by the IRGS, and connecting a voice call between the predetermined call-sending subscriber and the roaming service subscriber.

20. The method of claim 19, wherein when the call-sending subscriber of (b) is a GSM service subscriber who stays in the GSM system service area, (b) comprises:
the MSC being the GSM MSC, and the GSM MSC requesting location information of the call-receiving subscriber from the GSM HLR; and
the GSM HLR transmitting the location information request of the call-receiving subscriber to the IRGS.

21. The method of claim 19, wherein (d) comprises:
the IRGS receiving authentication parameters from the GSM HLR;
the IRGS transmitting a predetermined random number among the authentication parameters to the CDMA terminal of a target authenticated one;
the CDMA terminal transmitting the random number to a built-in SIM card;
the SIM card generating an authentication value by using the random number, and transmitting the authentication value to the CDMA terminal;
the CDMA terminal transmitting the authentication value to the IRGS;
the IRGS comparing the authentication value provided by the CDMA terminal with the predetermined authentication value among the authentication parameters provided by the GSM HLR; and
completing the authentication when the two values are identical according to the comparison results.

22. In a method for a subscriber of a global system for mobile communications (GSM) system service to move to a code division multiple access (CDMA) system service area, install a subscriber identity module (SIM) card in a CDMA terminal, roam to the CDMA system service and then send a short message in a system comprising a CDMA system comprising a CDMA mobile switching center (MSC) accessing calls, and a CDMA terminal wirelessly connected to the CDMA MSC and capable of having the SIM card removably installed therein; a GSM system comprising a GSM home location register (HLR) storing information on subscribers' locations and services, and a GSM MSC connected to the GSM HLR and accessing calls; and an international roaming gateway system (IRGS) connected between the CDMA system and the GSM system and converting signals to execute signal communications between the CDMA and GSM systems, a method for a GSM service subscriber who has roamed to the CDMA service to send a short message, comprising:

(a) the roaming service subscriber using the CDMA terminal to request a short message-sending from the CDMA MSC;

(b) the CDMA MSC transmitting the short message provided by the CDMA terminal to the IRGS;

(c) the IRGS obtaining location information of the call-receiving subscriber via the GSM HLR;

(d) the IRGS transmitting the short message to the MSC corresponding to the call-receiving subscriber; and (e) the MSC transmitting the short message provided by the IRGS to a wirelessly connected terminal.

23. The method of claim 22, wherein when the call-receiving subscriber of (c) is a GSM service subscriber who stays in the GSM system service area, (c) comprises the GSM HLR receiving location information of the call-receiving subscriber from the GSM MSC and transmitting the location information to the IRGS.

24. In a method for a subscriber of a global system for mobile communications (GSM) system service to move to a code division multiple access (CDMA) system service area, install a subscriber identity module (SIM) card in a CDMA terminal, roam to the CDMA system service and then send a short message in a system comprising a CDMA system comprising a CDMA mobile switching center (MSC) accessing calls, and a CDMA terminal wirelessly connected to the CDMA MSC and capable of having the SIM card removably installed therein; a GSM system comprising a GSM home location register (HLR) storing information on subscribers' locations and services, a GSM MSC connected to the GSM HLR and accessing calls, and a GSM short message center (SMC) connected to the GSM MSC and transmitting messages; and an international roaming gateway system (IRGS) connected between the CDMA system and the GSM system and converting signals to execute signal communications between the CDMA and GSM systems, a method for a GSM service subscriber who has roamed to the CDMA service to send a short message, comprising:

(a) a predetermined sending subscriber using a terminal to request a short message-sending to the roaming service subscriber;

(b) the MSC, wirelessly connected to the terminal of the sending subscriber, transmitting the short message to the IRGS;

(c) the IRGS transmitting the short message to the CDMA MSC corresponding to the roaming service subscriber; and (d) the CDMA MSC transmitting the short message to the CDMA terminal of the roaming service subscriber.

25. The method of claim 24, wherein when the sending subscriber of (b) is a GSM service subscriber who stays in the GSM system service area, (b) comprises:

the GSM MSC transmitting the short message to the GSM SMC;

the GSM SMC obtaining location information of a short message-receiving subscriber via the GSM HLR; and the GSM SMC transmitting the short message to the IRGS.

* * * * *